United States Patent
Fischer et al.

(10) Patent No.: US 9,446,469 B2
(45) Date of Patent: Sep. 20, 2016

(54) DEVICE FOR AXIALLY HOLDING AN ELEMENT OF ELONGATE SHAPE AND FOR SETTING IT IN ROTATION AROUND ITS AXIS

(75) Inventors: Marc Fischer, Montelimar (FR); Jean-Marc Boyer, Saint Hilaire de Brethmas (FR)

(73) Assignee: Areva NC, Paris (FR)

( * ) Notice: Subject to any disclaimer, the term of this patent is extended or adjusted under 35 U.S.C. 154(b) by 708 days.

(21) Appl. No.: 13/881,679

(22) PCT Filed: Oct. 28, 2011

(86) PCT No.: PCT/EP2011/069019
§ 371 (c)(1),
(2), (4) Date: Apr. 25, 2013

(87) PCT Pub. No.: WO2012/056013
PCT Pub. Date: May 3, 2012

(65) Prior Publication Data
US 2013/0292361 A1 Nov. 7, 2013

(30) Foreign Application Priority Data

Oct. 29, 2010 (FR) .................................... 10 58948

(51) Int. Cl.
*B23K 9/028* (2006.01)
*B23K 37/053* (2006.01)
(Continued)

(52) U.S. Cl.
CPC ............ *B23K 9/0026* (2013.01); *B23K 9/028* (2013.01); *B23K 9/0282* (2013.01);
(Continued)

(58) Field of Classification Search
CPC ..... B23K 37/0538; B23K 9/0026; B23K 9/028; B23K 9/0282; B23B 23/00; B23B 23/04; B23B 23/045; B23Q 1/26; G21C 21/00; G21C 3/00; G21C 3/10
See application file for complete search history.

(56) References Cited

U.S. PATENT DOCUMENTS 3,895,789 A * 7/1975 Mengeringhausen . B23K 9/028
269/49
3,938,845 A 2/1976 Fehl et al.
(Continued)

FOREIGN PATENT DOCUMENTS

CN 1031295 A 2/1989
FR 2 113 117 A5 6/1972
(Continued)

OTHER PUBLICATIONS

Decision of Grant in Russian Application No. 2013124816, dated Aug. 10, 2015.
(Continued)

*Primary Examiner* — Geoffrey S Evans
(74) *Attorney, Agent, or Firm* — Nixon Peabody LLP; Khaled Shami

(57) ABSTRACT

An installation for welding top plugs on to nuclear fuel rods comprising a device for axially holding the rod and setting it in rotation and a weld chamber, where the device comprises a gripper and structure to close the gripper on the rod, where the structure comprise a pusher to apply an axial force on to the gripper, a linear actuator of axis parallel to the lengthways axis of the device, a yoke translationally secured to the pusher, and able to rotate freely around a fixed axis orthogonal to the lengthways axis which is not secant with the latter, where the yoke is connected and able to pivot relative to the linear actuator around a fixed axis parallel to the orthogonal axis such that the linear actuator causes the yoke to rotate around the first orthogonal axis and causes the pusher to slide, closing the gripper on the rod.

23 Claims, 8 Drawing Sheets

Figure 1:
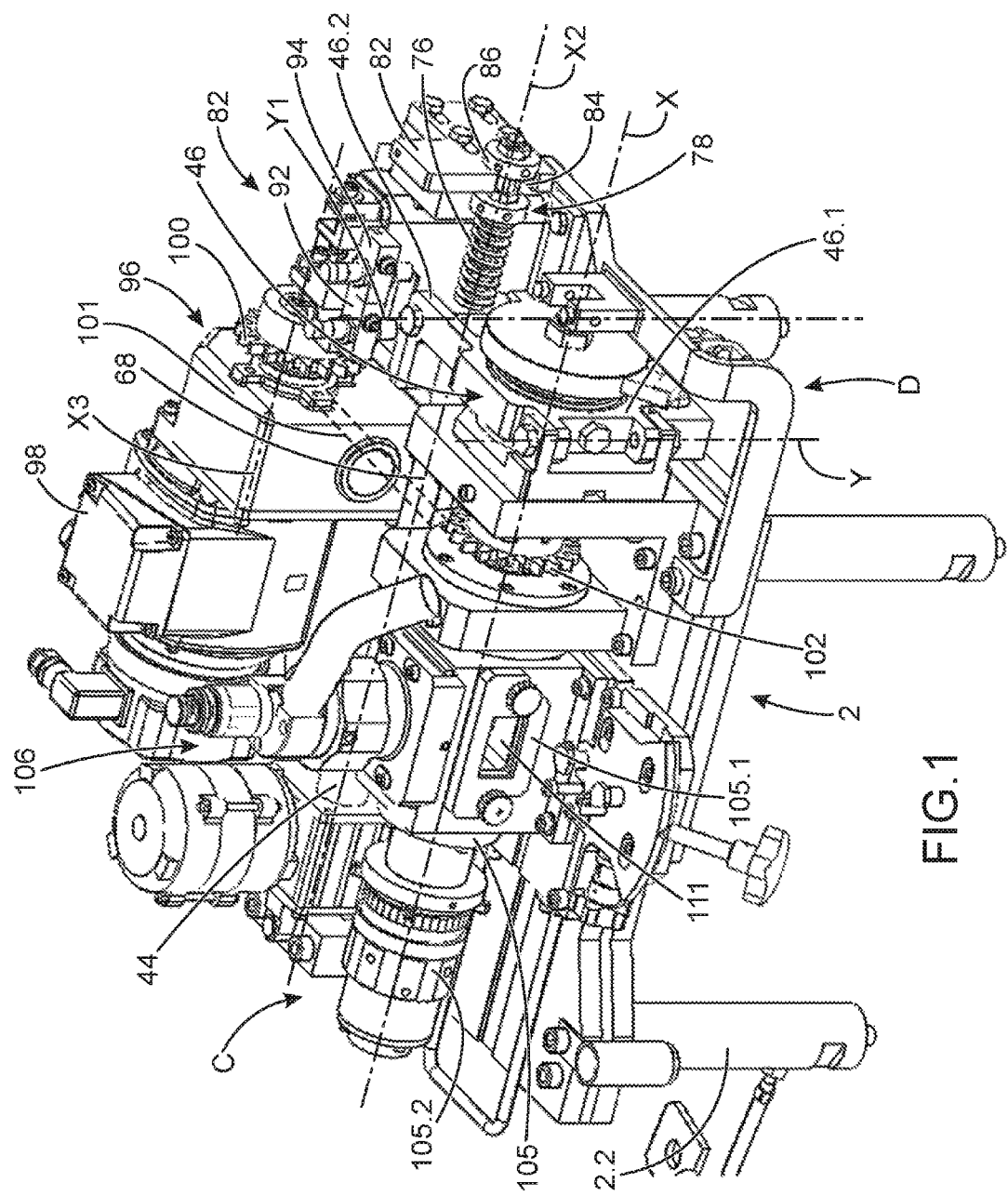

(51) Int. Cl.
*B23K 9/00* (2006.01)
*B23Q 1/26* (2006.01)
*G21C 3/10* (2006.01)
*G21C 21/00* (2006.01)

(52) U.S. Cl.
CPC ............ *B23K 37/0538* (2013.01); *B23Q 1/26* (2013.01); *G21C 3/10* (2013.01); *G21C 21/00* (2013.01); *Y02E 30/40* (2013.01)

(56) References Cited

U.S. PATENT DOCUMENTS

| | | | |
|---|---|---|---|
| 4,075,454 | A | 2/1978 | Duncan |
| 4,188,521 | A | 2/1980 | Yeo |
| 4,646,414 | A | 3/1987 | Wilson et al. |
| 4,725,705 | A | 2/1988 | Holland-Moritz et al. |
| 4,828,437 | A * | 5/1989 | Mukherjee .............. B23B 23/00 269/20 |
| 4,837,419 | A | 6/1989 | Boatwright |
| 4,857,691 | A | 8/1989 | Boatwright |
| 4,863,674 | A | 9/1989 | Handel et al. |
| 5,075,527 | A * | 12/1991 | Ikuma .................. B23K 37/053 219/125.11 |
| 5,319,178 | A | 6/1994 | Sando et al. |
| 2004/0238594 | A1 | 12/2004 | Juranitch |

FOREIGN PATENT DOCUMENTS

| | | | |
|---|---|---|---|
| FR | 2245055 | A1 | 4/1975 |
| FR | 2683935 | A1 | 5/1993 |
| GB | 1 368 140 | A | 9/1974 |
| JP | 54-32149 | A | 3/1979 |
| JP | 59-209487 | A | 11/1984 |
| JP | 61-229480 | A | 10/1986 |
| JP | 62-79917 | A | 4/1987 |
| JP | 07-040057 | A * | 2/1995 |
| JP | 8-108304 | A | 4/1996 |
| JP | 9-108833 | A | 4/1997 |
| JP | 9-220669 | A | 8/1997 |
| JP | 10-227891 | A * | 8/1998 |
| JP | 11-5167 | A | 1/1999 |
| JP | 11-23767 | A | 1/1999 |
| JP | 11-190788 | A | 7/1999 |
| JP | 2000-39495 | A * | 2/2000 |
| JP | 2000334564 | A | 12/2000 |
| JP | 2009-198368 | A | 9/2009 |
| RU | 2 249 863 | C2 | 4/2005 |

OTHER PUBLICATIONS

Office Action in Japanese Patent Application No. 2013-535454, dated Sep. 24, 2015.

Office Action in Chinese Application No. 201180052868.0, issued Mar. 27, 2015.

International Search Report, PCT/EP2011/069019, dated Feb. 7, 2012.

French Preliminary Search Report for French Application No. 1058948, dated Oct. 12, 2011.

* cited by examiner

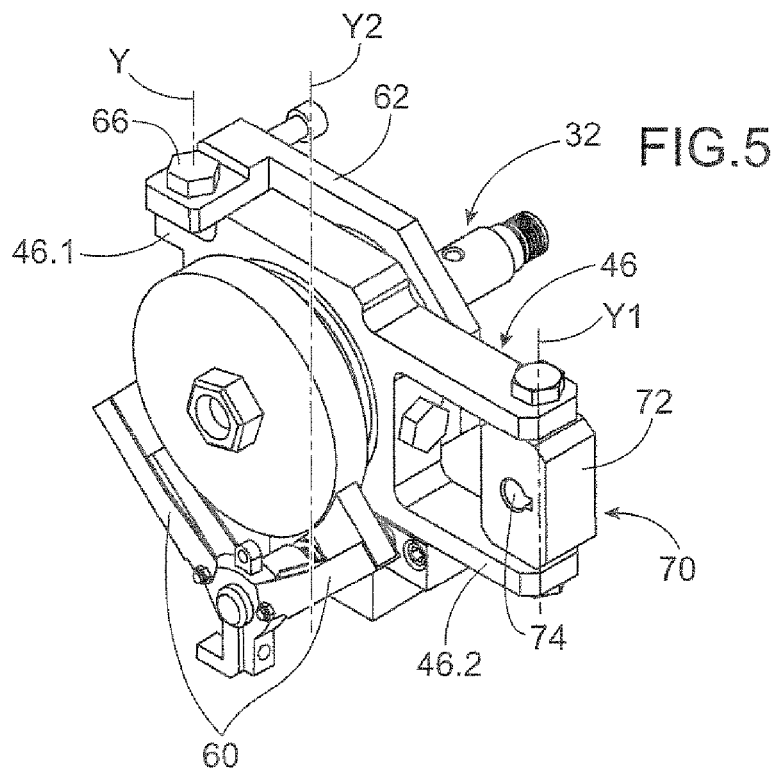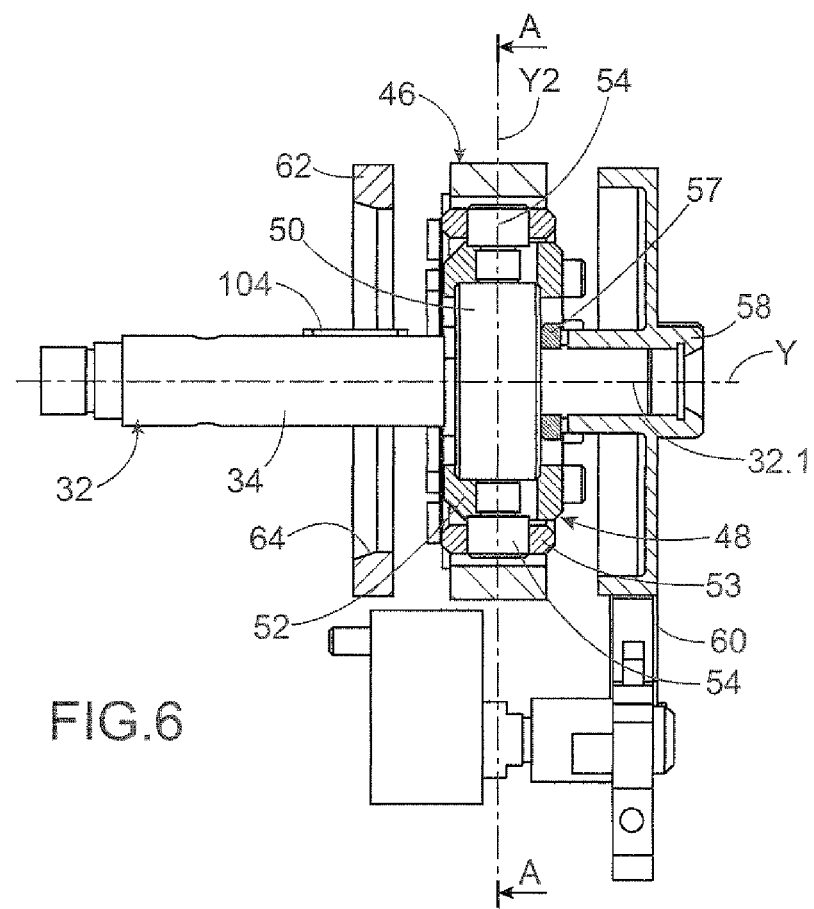

DEVICE FOR AXIALLY HOLDING AN ELEMENT OF ELONGATE SHAPE AND FOR SETTING IT IN ROTATION AROUND ITS AXIS

TECHNICAL FIELD AND PRIOR ART

The present invention relates to a device for axially holding an element of elongate shape and for setting it in rotation around its axis. The elongate shape may comprise, for example, a cladding filled with nuclear fuel and a top plug, and the device is associated with a weld chamber to weld the top plug on to the cladding, thus forming a nuclear fuel crayon.

Welding of the top plug on to the cladding is accomplished by means of an electrode positioned at right angles to the axis of the cladding in the mating surface between the plug and the cladding. Great accuracy is therefore required when positioning the cladding fitted with the top plug to be certain of accomplishing the weld. In addition, since the welding electrode is immobile, it is the cladding and top plug assembly which is made to rotate around the axis of the cladding to produce a weld across the entire periphery of the top plug.

A device to produce the weld between a nuclear fuel cladding and a plug consequently comprises a device to hold the cladding and top plug assembly in a given axial position of the cladding and top plug assembly, and to rotate the assembly around the axis of the cladding, whilst holding the given axial position.

Document FR 2 683 935 describes a welding device for fuel rod end plugs. The device comprises a gripper installed at the end of a hollow shaft, where the gripper is divided radially, and an element to close the gripper installed around the hollow shaft and the gripper which is able to move in the axial direction of the shaft. The rod fitted with the plug is introduced into the hollow shaft and into the gripper, the closure element is moved axially using a piston, the effect of which is to tighten the gripper on the rod, holding it axially. Means to rotate the hollow shaft are provided. This device also comprises a rack to position the gripper axially, a piston moved by a fluid to move the rack, and a pressing mechanism to press the end of the rod fitted with the plug against a stop in the weld chamber.

This device is very complex, comprising many parts which move relative to one another, and installing the rod before the weld comprises many steps.

Document FR 2 245 055 describes a device to weld a plug on to a fuel rod comprising a tightening bushing installed in a bushing-holder to tighten the rod. This bushing is tightened on the cladding by means of several hydraulic or pneumatic jacks which move the bushing-holder, forcing the bushing to close on the rod. The jacks are positioned near the entrance through which the cladding is introduced into the device.

This device requires several jacks, making it bulky. In addition, sealing problems can be posed in proportion to the number of jacks used.

One aim of the present invention is consequently to provide a device to hold an element of elongate shape, and set it in rotation around its axis, which is of simple and robust manufacture.

DESCRIPTION OF THE INVENTION

The aim of the present invention is attained by means of a device to hold an element of elongate shape and set it in rotation around its axis comprising a recess of lengthways axis to receive the elongate element, means to tighten said elongate element, said tightening means comprising a gripper which tends to close on the elongate element by application of an axial effort, said effort being provided by a linear actuator, and transmitted to the gripper via a pusher member. Said pusher member is, for its part, moved by the linear actuator by means of a yoke connected and able to rotate around an axis perpendicular to the axis of the recess, and connected to the linear actuator opposite the hinge axis relative to the lengthways axis. When the linear actuator is activated, the yoke thus pivots around the hinge axis, causing the pusher to move along the lengthways axis, which causes the gripper to tighten on the elongate element. The gripper is installed such that it can rotate freely around the lengthways axis, in order to be able to set the elongate element in rotation, while holding it clamped.

Thus, since the device comprises only a single linear actuator the clamping means are simplified. The sealing problems are reduced. Furthermore, control is simplified since it relates only to a single linear actuator.

The subject-matter of the present invention is then a device for axially holding an elongate element of lengthways axis and setting it in rotation around its axis, said device of lengthways axis comprising:
  a gripper formed by means able to exert radial tightening forces on the periphery of said elongate element aligned towards the lengthways axis, by bringing said means close to said lengthways axis,
  a device for tightening the gripper formed by means to cause said gripper to come closer, said tightening device comprising a pusher to apply an axial force on said gripper, a counter thrust bearing to force said gripper to come closer to the lengthways axis under the effect of the axial force, a linear actuator of axis parallel to the lengthways axis of the device, a yoke translationally secured to said pusher, and able to rotate around a first axis orthogonal to the lengthways axis, and not secant with it, said first orthogonal axis being fixed, said yoke being hinged to the linear actuator around a second orthogonal axis parallel to the first orthogonal axis located opposite the first orthogonal axis relative to the lengthways axis, such that the linear actuator causes the yoke to rotate around the first orthogonal axis, and means to control the linear actuator in accordance with the position of the yoke, said pusher being able to rotate freely in said yoke,
  means to cause the gripper and said pusher to rotate.

The device for axial holding and setting in rotation may comprise:
  a hollow shaft of lengthways axis in which said pusher is installed such that it can slide freely, said pusher beings rotationally secured to said shaft
  bearings in which the shaft is mounted,
  the means to cause rotation of the means able to exert radial tightening forces on the periphery of said elongate element and said pusher, directly rotating said shaft.

For example, the means to cause rotation comprise an electric motor, a first gear engaged with the electric motor, a chain surrounding said first gear, and a second gear which is rotationally secured to said shaft and coaxial with said shaft.

The means of control of the actuator may comprise at least one sensor to detect the position of the yoke in the clamped position. For example, the control means comprise a metal part rigidly connected to the yoke, and in which said sensor is an inductive sensor, where the detection of the presence of said metal part by said sensor corresponds to a clamped position.

The device for axial holding and setting in rotation can advantageously comprise a second sensor to detect the unclamped position.

According to an additional characteristic the linear actuator may be a pneumatic jack, said device also comprising an axial force transmission shaft connecting the jack and the yoke, a hinge between said axial force transmission shaft and said yoke comprising a universal joint which is hinged to the yoke around the second orthogonal axis, said universal joint being traversed by said axial force transmission shaft, and said shaft being connected to said universal joint.

The device for axial holding and setting in rotation can advantageously comprise elastic means installed compressed between said universal joint and a free end of said shaft.

The device for axial holding and setting in rotation may comprise means for adjusting the load of said elastic means.

The device for axial holding and setting in rotation may also comprise mechanical stop means to limit the angular movement of the yoke. The mechanical stop means advantageously comprise at least one stop installed on the free end of the axial force transmission shaft and an immobile counter thrust bearing, where said axial force transmission shaft traverses the immobile counter thrust bearing, and said stop is positioned on the other side of the counter thrust bearing relative to the hinge between the yoke and the axial force transmission shaft.

In addition, the device for axial holding and setting in rotation may comprise a second stop on the axial force transmission shaft between the hinge and the counter thrust bearing. The position along the axis of one and/or other stop is then preferably adjustable.

According to another additional characteristic, the yoke comprises a bore made between the first and second orthogonal axes, a hub installed such that it can pivot in said bore around an axis parallel to the first and second orthogonal axes, and a rolling bearing installed in said hub, the pusher being installed in said rolling bearing.

Another subject-matter of the present invention is a welding installation for welding the top plugs on the nuclear fuel rods, comprising a device for axial holding and setting in rotation according to the invention, and a weld chamber, where the rods form elongate elements, said device comprising a through recess of lengthways axis in which the rod is intended to be held axially by tightening, and to pivot around its axis, said weld chamber being positioned at one end of the through passage opposite the end where the rod is introduced, the end of the rod fitted with the plug emerging from said passage in a welding area of said weld chamber, and said weld chamber comprising means of welding the top plug on the rod.

The weld chamber advantageously comprises a stop for the top plug of the rod aligned with the lengthways axis of the device.

The weld chamber may comprise means to create a vacuum and to inject an inert gas, and to analyse the atmosphere of said chamber, and a fluid channel connecting the means to create a vacuum and to inject in the welding area.

The stop is preferably pierced with a lengthways channel, the fluid channel being connected to the welding area through the lengthways channel of the stop. The fluid channel is, for example, formed by a tube rotationally secured to the stop, where said tube is installed in bearings, and the stop is rotated by the rod.

The welding installation may comprise means to display the position of the welding means relative to a mating surface between the top plug and the cladding of the rod.

The welding installation may also comprise checking means to give or refuse authorisation to weld in accordance with the speed of rotation of the rod and/or the quality of the atmosphere and/or the level of tightening and/or the position of the welding means relative to the mating surface.

Another subject-matter of the present invention is a welding method implementing the installation according to the invention, comprising the following steps:

insertion of the rod fitted with the top plug into the passage of the device, until the top plug comes to rest against the stop of the weld chamber,
operation of the rod tightening means,
setting the rod in rotation,
generation of a vacuum in the welding area,
injection of inert gas,
welding.

Prior to welding, the speed of rotation of the rod and/or the quality of the atmosphere and/or the tightening level and/or the position of the welding means relative to the mating surface are preferably checked.

BRIEF DESCRIPTION OF THE ILLUSTRATIONS

Figure 2:
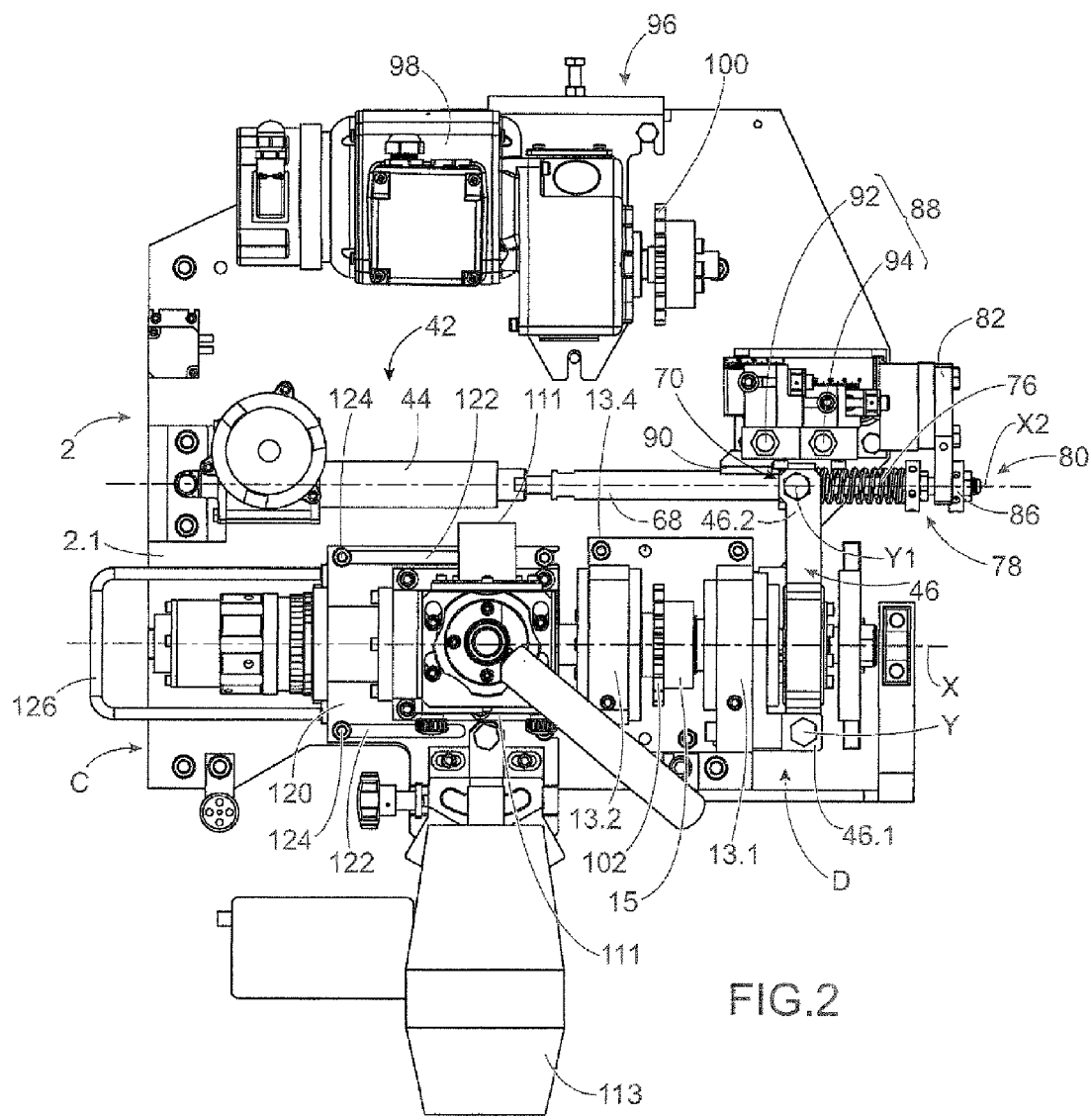
Figure 3:
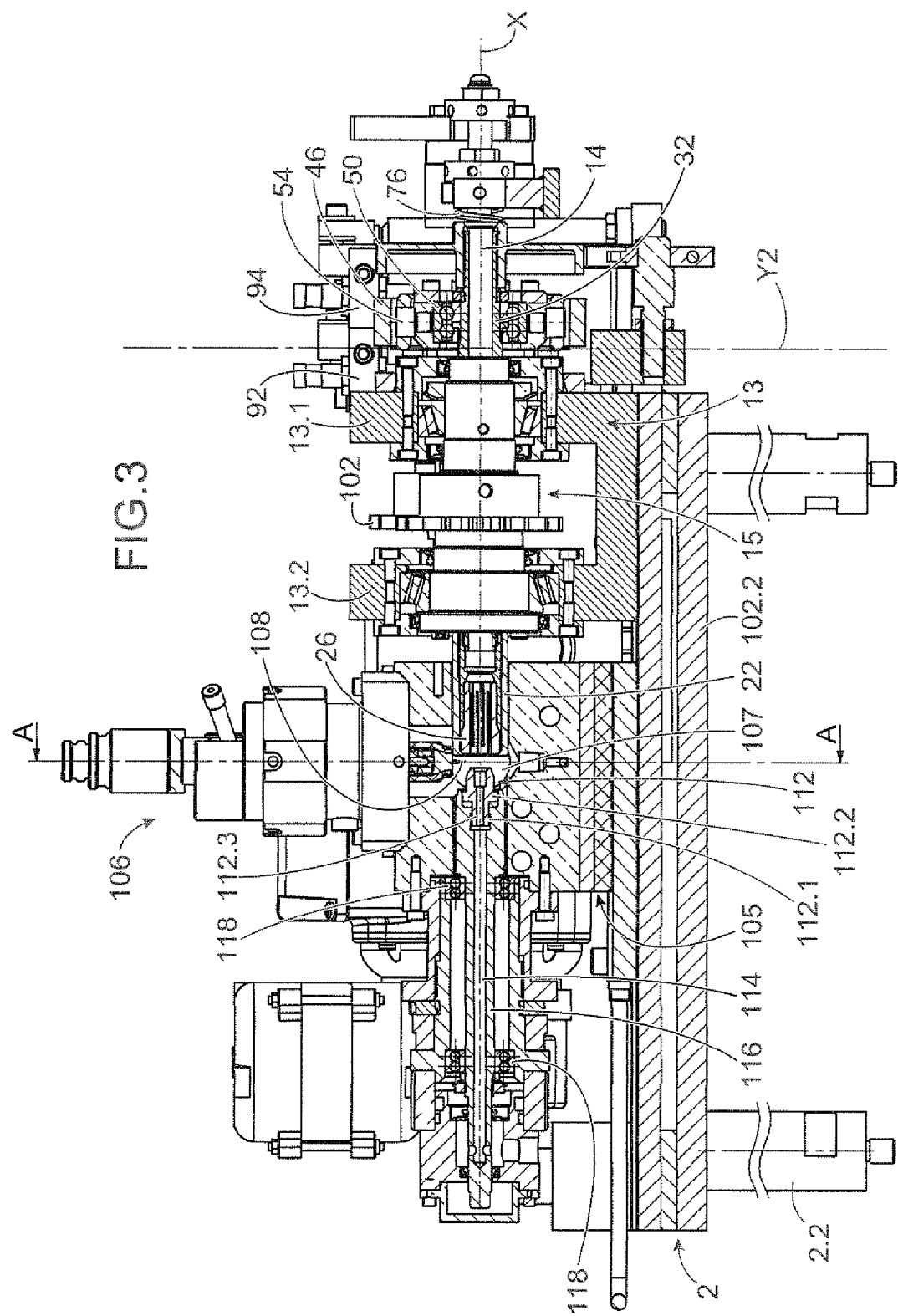
Figure 4:
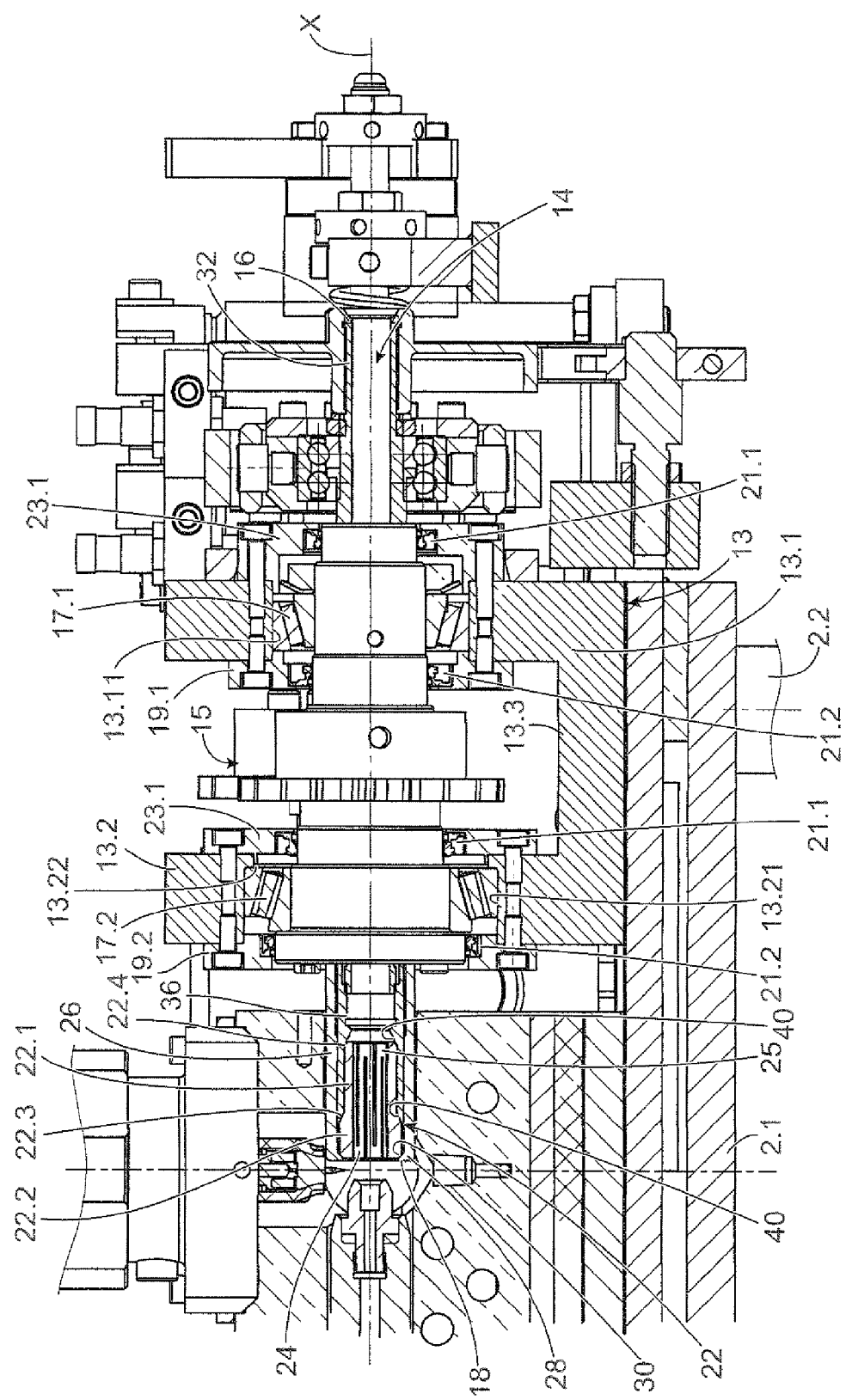
Figure 7:
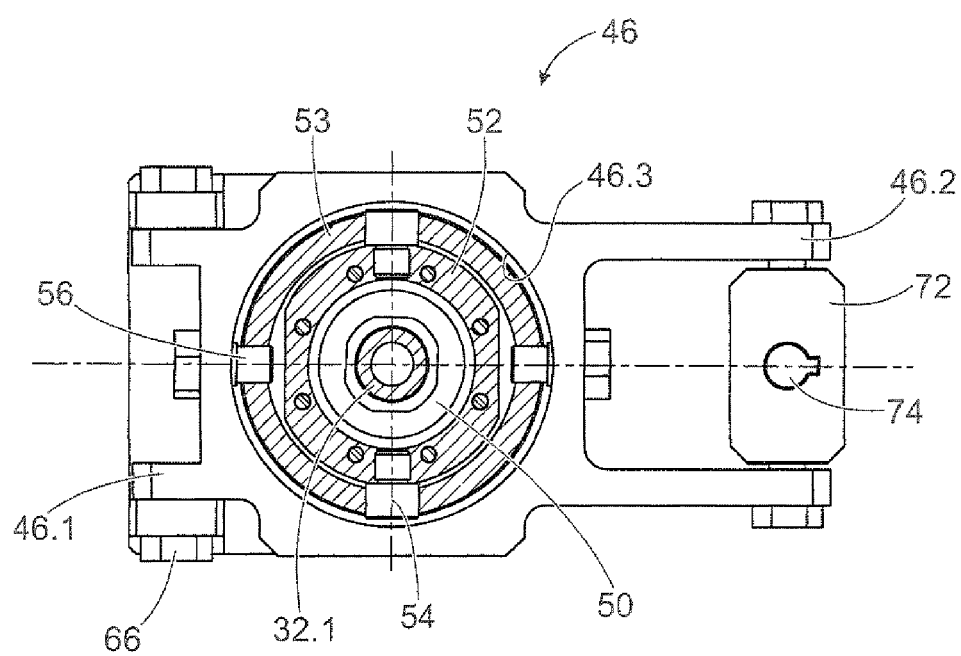
Figure 8:
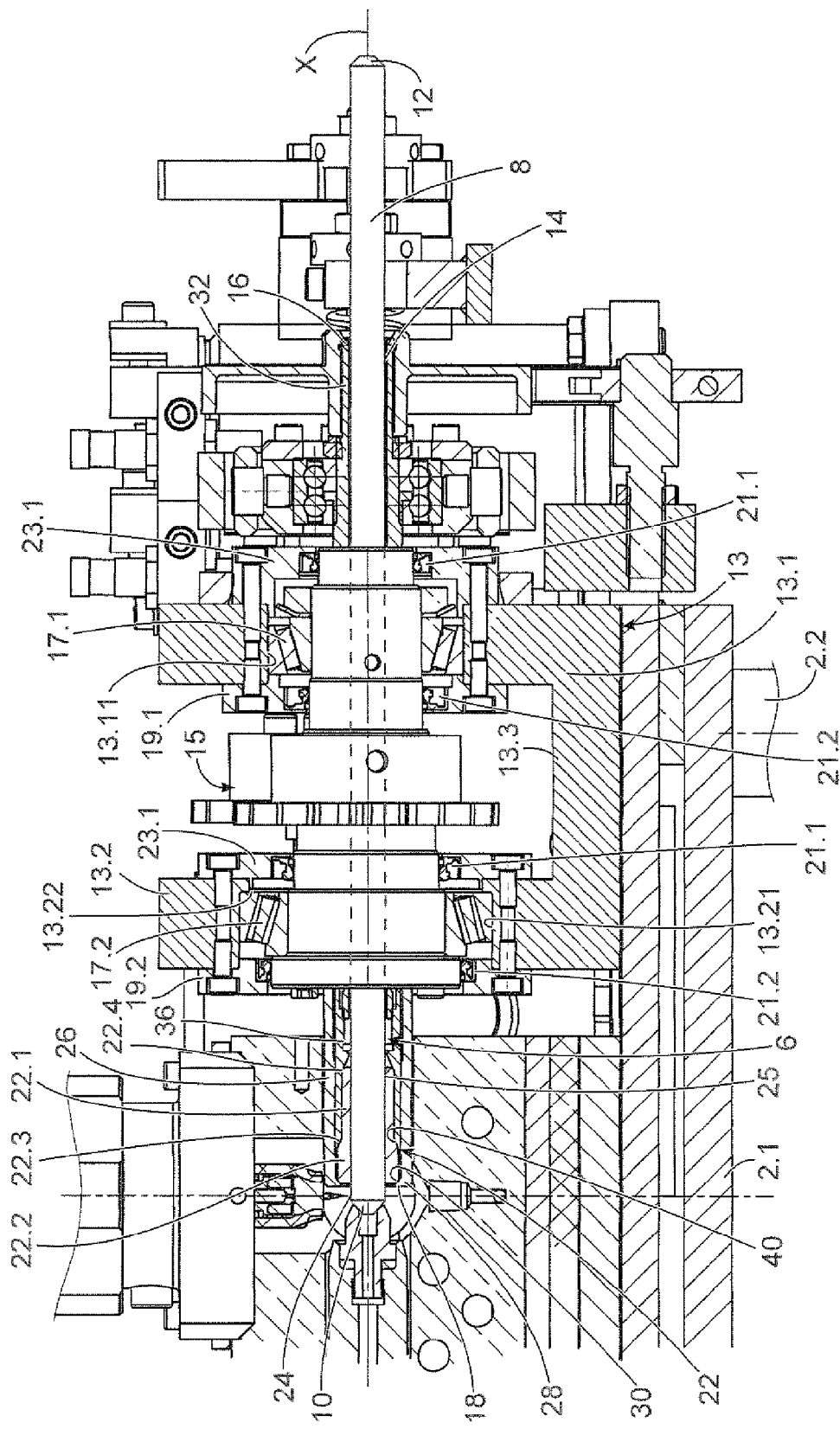
Figure 9:
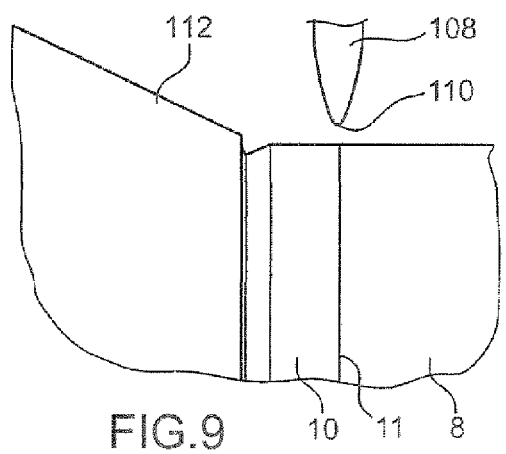
Figure 10:
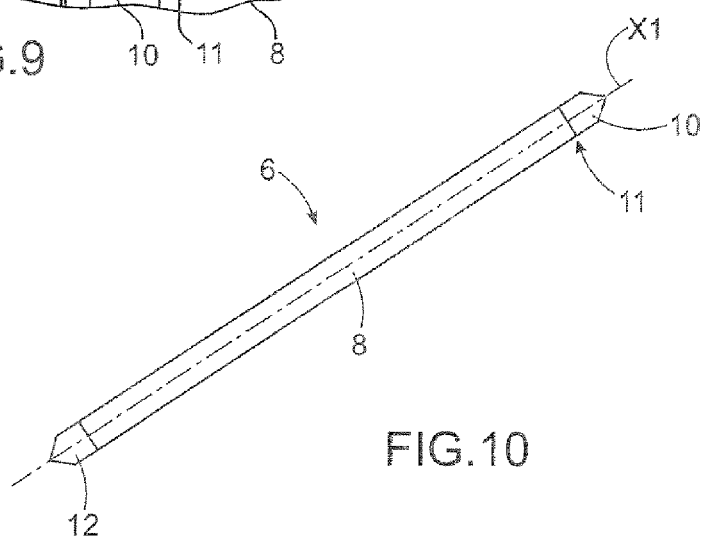
Figure 11:
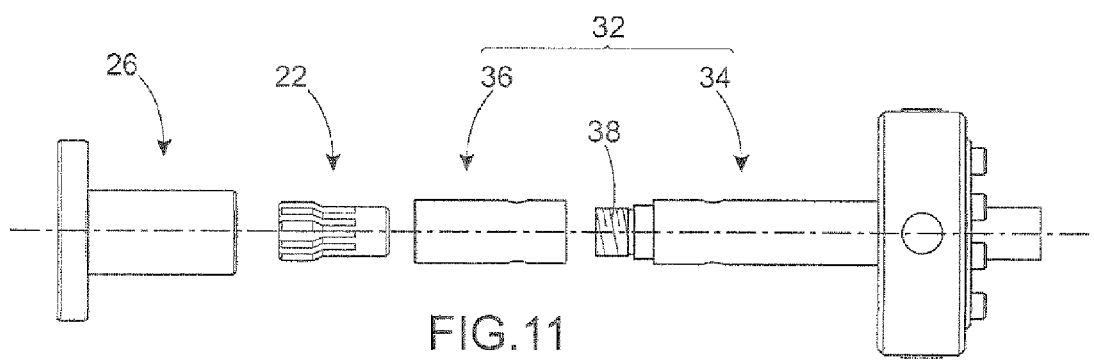

The present invention will be better understood using the description which follows and the appended illustrations, in which:

FIG. 1 is a perspective view seen from the top of an example embodiment of an installation for welding a top plug on to a nuclear fuel cladding according to the present invention, FIG. 2 is a top view of the welding installation of FIG. 1, FIG. 3 is a section view along plane A-A of FIG. 2, FIG. 4 is a detailed view of FIG. 3 showing a device for axial holding and setting in rotation, FIG. 5 is a three-quarters perspective view of a portion of the device for axial holding and setting in rotation located at the entrance of said device, FIG. 6 is a lengthways section view of the portion represented in FIG. 5, FIG. 7 is a partial section view of FIG. 6 along a plane A-A, FIG. 8 is a view identical to that of FIG. 3, where a rod is positioned in the installation, FIG. 9 is a side view of the top plug in position in the weld chamber, where the welding electrode is facing the mating surface between the top plug and the cladding, FIG. 10 is a schematic representation of a nuclear fuel rod fitted with its top plug, and intended to be welded by the welding installation of FIG. 1, FIG. 11 is an exploded perspective view of a variant of the clamping means of the holding device.

DETAILED ACCOUNT OF PARTICULAR EMBODIMENTS

The device for axial holding and setting in rotation will be described in connection with an installation for welding a top plug on a nuclear fuel cladding in the field of manufacture of nuclear fuel rods. However, the device for axial holding and setting in rotation may be implemented in all fields in which an element of elongate shape must be held by clamping and simultaneously set in rotation around its axis.

The element of elongate shape in the example which will be described is a nuclear fuel rod; it comprises a cladding formed by a tube sealed at one end and open at the other, in which nuclear fuel is placed, for example in the form of stacked pellets; the rod comprises a plug sealing the open end of the cladding, called the top plug. The seal between the top plug and the cladding is achieved by welding in the area of the circular-shaped joint between the cladding and the top plug. Welding is the operation undertaken in the installation according to the present invention. The top plug comprises a through passage which is sealed at a later stage, after pressurising the interior of the rod; this operation is called seal welding.

In the following description, the terms "upstream" and "downstream" must be considered in relation to the direction of introduction of the rod into the installation; in the illustrations this is the left-to-right direction.

In FIGS. 1, 2 and 3, an example of a welding installation according to the present invention can be seen. This comprises a device D for axial holding of the rod and for setting it in rotation around its axis, and a weld chamber C. Device D for axial holding of the rod and for setting it in rotation around its axis will henceforth be designated the "holding device", for the sake of simplicity.

Holding device D and weld chamber C are positioned on a table 2 fitted with a plate 2.1 installed on stands 2.2.

Holding device D and weld chamber C are aligned along a lengthways axis X and form a passage for a fuel rod with a view to welding it, where the end of the rod fitted with the top plug traverses holding device D and emerges in weld chamber C.

In FIG. 10 a rod 6 intended to be welded by the installation according to the present invention can be seen. Rod 6 of lengthways axis X1 comprises a cladding 8 open at one lengthways end, and a top plug 10. Cladding 8 is filled with fuel before the plug is put in position. Connection 11 between cladding 8 and plug 10, called the mating surface, is circular in shape and centred on axis X1. The other end of cladding 8 is sealed by a bottom plug 12 which has been welded on the cladding before being filled with the nuclear fuel.

In FIG. 4 a lengthways section view of holding device D can be seen; this comprises a frame 13 attached on to plate 2.1 of table 2. In the represented example, frame 13 comprises two parallel brackets 13.1, 13.2 which are perpendicular to the plane of table 2 and to lengthways axis X, and are connected by a cross-member 13.3 attached to plate 2.1. For example, cross-member 13.3 is attached to the plate by screws 13.4 (visible in FIG. 2).

Both brackets 13.1, 13.2 have a circular through passage 13.11, 13.21 of lengthways axis X; these passages 13.11, 13.21 are intended to form, with rolling bearings, stages for a shaft which will be described in due course.

The device comprises a through passage 14 of lengthways axis X to receive rod 6. Passage 14 comprises a first lengthways end 16 which is open to allow rod 6 to be introduced into housing 14, and a second lengthways end 18 emerging in weld chamber C. This p14 is particularly visible in FIG. 8, where a rod 6 is positioned in it.

Holding device D comprises means of clamping rod 6, and more specifically cladding 8. When installed in holding device D, rod 6 is housed in the clamping means. In addition, holding device D is intended to allow rod 6 to rotate around lengthways axis X; to this end the clamping means are installed such that they can pivot around lengthways axis X, causing the rod to rotate with them around lengthways axis X.

To this end, holding device D comprises a shaft 15 installed such that it can pivot in passages 13.11, 13.21 of brackets 13.1, 13.2. The shaft comprises a through passage 15.1 of lengthways axis X to receive a lengthways portion of the clamping means.

Shaft 15 is installed in rolling bearings 17.1, 17.2 installed respectively in passages 13.11, 13.21 of brackets 13.1, 13.2.

In the represented example, rolling bearings 17.1, 17.2 are roller bearings installed in X.

In the represented example, bearing 17.1 is held in bracket 13.1 between two clamping flanges 19.1 and 23.1, attached to the brackets by screws. Bearing 17.2 is installed immobile in bracket 13.2 between a shoulder 13.22 in opening 13.21 and a clamping flange 19.2. The flange 19.2 is, for example, held by screws in the bracket.

Other installations are conceivable.

Shaft 15 is able to pivot in sealed fashion; to this end, sealing means 21.1, 21.2, for example of the lip seal type, are installed around the shaft upstream and downstream from rolling bearings 17.1, 17.2 in the direction in which the rod is introduced into passage 14. Upstream seals 21.1 are housed in flanges 23.1, 23.2 attached to brackets 13.1, 13.2 opposite clamping flanges 19.1, 19.2 of the bearings. Downstream seals 21.2 are housed in clamping flanges 19.1, 19.2. The seals prevent any leakage of greasy substances, of the oil or lubricant type, contained in the bearings, in the direction of the rod.

The shaft is preferably formed from several coaxial parts attached to one another.

The clamping means are rotationally secured to shaft 15.

The rod clamping means extend from entrance end 16 of holding device D to exit end 18. They comprise a bushing 22 emerging in the weld chamber which can be seen in FIG. 4. Bushing 22 is divided along a portion of its length forming lobes 24 connected to a ring 25, where lobes 24 are intended to be brought radially close to lengthways axis X in order to grip cladding 8. The outer surface of bushing 22 comprises a first portion 22.1 of smaller diameter aligned opposite to weld chamber C, and a second portion of larger diameter 22.2 aligned on the side of weld chamber C, where both portions are connected by a conical shoulder 22.3. The upstream end of the bushing is also fitted with a conical shoulder 22.4.

The clamping means also comprise a gripper tightening device 26 formed from a tube of internal diameter greater than the external diameter of bushing 22, and in which bushing 22 is housed. The internal diameter of the tube of gripper tightening device 26 is roughly constant, except at one lengthways end 28 which is aligned towards weld chamber C, which is fitted with an internal chamfer 30 forming a conical bearing area aligned such that lobes 24 of bushing 22 tighten towards the lengthways axis, when bushing 22 is pressed against internal chamfer 30.

In FIG. 4, the clamping means allow welds known as "near clamp" welds; the tightening bushing is for example located 3 mm from the mating surface to be welded.

With the variant represented in FIG. 11 welds known as "far clamp" welds can be produced; the bushing is for example located approximately 60 mm from the mating surface to be welded. In FIG. 11 an exploded perspective view of bushing assembly 22, gripper tightening device 26 and pusher 32 can be seen.

Clamping means 20 also comprise means to press bushing 22 against internal chamfer 30 of gripper tightening device 26. These means are formed by a pusher 32 extending between the bushing and the entrance end.

In the represented example, pusher 32 comprises a tubular shaft 34 of sufficient internal diameter to allow rod 6 to pass through and an end-piece 36 installed at one lengthways end 38 of shaft 34, resting on bushing 22.

End-piece 36 is hollow to allow rod 6 to pass through. End-piece 36 is for example screwed by one lengthways end on to lengthways end 38 of shaft 34 and comprises at the other lengthways end two internal seatings 40 surrounding the external periphery of the portion of smaller diameter 22.1 of bushing 22 and resting against conical shoulders 22.3, 22.4.

Thus, when pusher 32 is moved axially in direction of weld chamber C, pusher end-piece 36 presses against both conical shoulders 22.3, 22.4 of the bushing which are present inside end-piece 36, which are themselves pressing against internal chamfer 30 of gripper tightening device 26, then causing the lobes to move together in the direction of lengthways axis X, and clamping of cladding 8.

Holding device D also comprises motive means causing motion of pusher 32 in the lengthways axis. Lengthways motive means 42 comprise a linear actuator 44 of axis X2 parallel to axis X, which can be seen in FIG. 2, which is able to exert a force parallel to the lengthways axis, and where a yoke 46 surrounds an upstream end 32.1 of pusher 32. Yoke 46 is installed by a first lateral end 46.1 which is pivoting relative to frame 13 around an axis Y contained in a plane orthogonal to lengthways axis X, where axis Y is not secant with axis X. Yoke 46 is also connected in pivoting fashion to linear actuator 44 around an axis Y1 parallel to axis Y by a second lateral end 46.2, such that a movement of the linear actuator causes the yoke to pivot around axis Y.

Yoke 46 is translationally secured to the upstream end of pusher 32. In FIGS. 5 to 7 an example of means 48 accomplishing this rigid connection can be seen.

Means 48 comprise a rolling bearing 50 surrounding the upstream end of pusher 32, a hub 52 in which rolling bearing 50 is installed immobile, where a ring 53 surrounds hub 52; hub 42 is connected and able to pivot in ring 53 around an axis Y2 parallel to axis Y. For example, the hinge is accomplished by means of screw 54 traversing ring 53.

Ring 53 is itself installed immobile in a bore 46.3 of yoke 46 by means of two screws 56. In the represented example, both screws 56 are diametrically opposite one another, in an axis perpendicular to axis Y2. This embodiment is particularly advantageous from a maintenance standpoint, since hub assembly 52, ring 53 and screw 54 is a commercially available spare part and can therefore easily be replaced.

However, an embodiment in which hub 52 is installed directly in yoke 46 does not go beyond the scope of the present invention.

In the represented example, rolling bearing 50 is a two-row ball bearing. A nut 57, of the locknut type, is installed on the pusher upstream from bearing 50 to immobilise bearing 50 axially on pusher 32.

When linear actuator 44 causes yoke 46 to pivot around axis Y, pusher 32 is thus moved along axis X, but can also pivot around axis X.

A handwheel nut 58 is attached to the portion of upstream end 32.1 of pusher 32 protruding from rolling bearing 50. Handwheel nut 58 is screwed on to this portion and covers means 48.

Head brushes 60 are installed under handwheel nut 58, in contact with its periphery. There are two such head brushes 60 arranged in a V-shape and attached on to the frame.

Handwheel nut 58 and head brushes 60 conduct from the current source to the rod to accomplish the welding.

We shall now describe in detail the assembly of yoke 46.

Yoke 46 is connected and able to pivot around axis Y on a mounting plate 62 fixed on the upstream face of bracket 13.1; mounting plate 62 is pierced with an aperture 64 such that it can be installed around shaft 15.

A shaft 66 rotationally secures mounting plate 66 and lateral end 46.1 of the yoke.

Linear actuator 44 is installed on table 2 along weld chamber C. The linear actuator is, for example, an electric jack. It is preferably a pneumatic jack which provides better control of the clamping force and the elimination of any risk of excessive clamping, which may cause damage to the rod, or to device D.

Jack 44 is connected to the yoke via a transmission shaft 68 and a hinge 70.

Hinge 70 comprises a universal joint 72 which is hinged to yoke 46 around axis Y1 and a bore 74 for the passage of shaft 68.

Advantageously, shaft 68 is not connected directly to the yoke by the universal joint, but through a helical spring 76 installed compressed between universal joint 72 and a stop 78 installed on shaft 68. Stop 78 can preferably be moved along shaft 68 to adjust the load of spring 76. Stop 78 is, for example, formed of a knurl and a nut. Use of a spring enables a constant clamping force to be maintained. Indeed, the load of the spring is calibrated such that beyond a certain displacement the spring is compressed, and the yoke ceases to pivot. Means to prevent shaft 68 rotating in universal joint 72 are provided; in the represented example this is a key. In addition, and very advantageously, mechanical stop means 80 are provided to limit the axial displacement of shaft 68 and, consequently, the pivoting of yoke 48 and the axial displacement of pusher 32.

In the represented example, mechanical stop means 80 comprise a plate 82 with a notch 84, attached to the plate upstream from yoke 48, where the upstream end of shaft 68 is received in notch 84 and a stop 86 is installed on the shaft upstream from plate 82, such that the axial displacement of the shaft in the direction of weld chamber C is limited. The position of stop 86 can also advantageously be adjusted along shaft 68, and the stop is advantageously formed by a nut and a thumble wheel.

Means to detect the state of device D are advantageously provided, i.e. whether the clamping means are in the tightened or untightened state. In the represented example these detection means 88 comprise an element 90 secured to yoke 46, called a flag, made of a metal, and two inductive sensors 92, 94 position laterally relative to flag 90. The position of one of sensors 92 corresponds to the position which the flag must have when the clamping means are in a tightened state, and the position of other sensor 94 corresponds to the position which the flag must have when the clamping means are in an open state.

Flag 90a is positioned at a distance from sensors 92 and 94 such that it is the only one of the metal parts of the device which is detected.

Flag 90 is preferably attached to shaft 68; since the movement of the latter is purely axial, comparatively to yoke 46. First sensor 92 is in a downstream position relative to second sensor 94.

It is clearly understood that the type of sensor is in no way restrictive; they could be optical or other sensors. The flag could be attached to another part representative of the position of the yoke, for example the yoke itself.

As a variant a pressure sensor could be installed in mechanical stop means 80.

Depending on the measured pressure it might or might not be considered that the rod is clamped.

In another variant, there might be only one sensor detecting the tightened state of the clamping means, and where the untightened state might, for example, be detected by a contact sensor in the mechanical stop on plate 82. Sensors 92, 94 are connected to the control of jack 44, and detection of the flag causes jack 44 to stop.

Very advantageously, means of adjusting the axial position of sensors 92, 94 along the shaft are comprised, so as to provide very great positioning accuracy of the sensors, and consequently very great accuracy in controlling the actuator. These means can allow micrometric adjustment of the axial positions of the sensors. For example, a graduated rule (not represented) is attached to the table along the sensors' brackets, the position of which along this rule can be modified.

The device also comprises means 96 to rotate the rod around axis X.

Means 96 are positioned laterally along the shaft and the jack; they have an axis X3 parallel to lengthways axis X. In the represented example means 96 comprise a motor 98, a gear 100 engaged with the shaft of motor 98, a gear 102 on shaft 15 and a chain 101 connecting gears 100 and 102. In the represented example gear 102 forms a portion of the periphery of shaft 15, located between brackets 13.1, 13.2.

Pusher 32 is rotationally secured to shaft 15. In the represented example the rigid connection is accomplished by means of a pin 104 which can be seen in FIG. 6, borne by pusher 32, and penetrating in a groove (not visible) made in the wall of the passage of shaft 15. Other means to rotationally secure the shaft 15 and pusher 12 from rotating could be provided. The dimensions of the key and of the groove are chosen to enable the pusher to have a sufficient axial displacement to cause bushing 22 to close.

Pulleys and a belt could be provided to transmit the rotation of the motor to the rod.

A protective cover (not represented) preferably covers both gears and the chain 101.

We shall now describe weld chamber C, which is particularly visible in FIGS. 1, 3 and 8.

Weld chamber C is positioned downstream from holding device D.

Chamber C is formed of a casing 105 delimiting a confined space 107 at slightly higher pressure than the external environment, a chamber in which the weld is accomplished in a controlled atmosphere.

Weld chamber C comprises welding means 106 formed by an electrode 108 installed through casing 105, and positioned at right angles to the lengthways axis. In FIG. 9, tip 110 of the electrode can be seen, facing axially the mating surface 11 between top plug 10 and cladding 8, and transversely as close as possible to cladding 8. Casing 105 comprises sealed lateral windows 111 made in both side walls of the weld chamber (FIG. 1) in the area of the electrode, to enable the position of mating surface 11 relative to electrode 108 to be viewed. In FIG. 2 a light source 113 can be seen, to illuminate the mating surface; a camera (not represented) is also provided in front of opposite window 111.

Weld chamber C also comprises means to position mating surface 11 of the rod to face the electrode 108. In the represented example, these means are formed by a stop 112 for top plug 10, the axial position of which can be adjusted according to the dimensions of the plug, and in particular its length. In addition, stop 112 can be replaced, depending on the size of top plug 10.

Stop 112 is adjusted such that mating surface 11 is directly positioned faced the electrode 108 when rod 6 comes to rest against stop 112. The transverse position of electrode 108 is adjusted by causing electrode 108 to penetrate to a greater or lesser extent in weld chamber C.

Weld chamber C comprises means to control the atmosphere in the chamber and the rod. These means comprise suction means to create a vacuum in the chamber and in the rod, in order to eliminate traces of oxygen, means to inject an inert gas, such as helium, and means to analyse the atmosphere and check for the presence of oxygen.

In the represented example, stop 112 is hollow and suction and inerting are accomplished through stop 112 and a channel 114 connected to the suction and inerting means. Channel 114 is made in a tube 116 of lengthways axis extending from the stop towards a downstream area of weld chamber C.

In the represented example stop 112 comprises a hollow rod 112.1 and a hollow head 112.2 through which a gas can flow. Hollow head 112.2 is such that it forms a recess for a free end of top plug 10. Hollow rod 112.1, for its part, has a thread 112.3 to enable it to be screwed into the channel; it is then easy to adjust the position of stop 112 axially by screwing rod 112.1 further or less far into tube 116.

Stop 112 is preferably rotated by rod 6 around axis X, preventing the plug being marked by a relative movement between the plug and the stop. Tube 116, for its part, is also rotated; for example, it is supported by a pair of rolling bearings 118. As a variant, tube 116 and stop 112 could be driven independently; means to synchronise drive means 96 and those of tube 116 and of stop 112 would then be provided.

In the example represented in FIG. 8 casing 105 is formed by a first portion 105.1 bearing welding means 106 and a second portion 105.2 in which fluid tube 116 extends, where second portion 105.1 is for example screwed on to the first portion in sealed fashion.

Very advantageously, weld chamber C can be moved axially relative to holding device D so as to make accessible the downstream end of device D through which top plug 10 of rod 6 exits, for maintenance of device D and of weld chamber C.

In the represented example casing 105 comprises a baseplate 120 with two through grooves 122 parallel to lengthways axis X, traversed by screws 124 screwed into plate 2.1 of table 2. When screws 124 are untightened baseplate 120 can slide along lengthways axis X; when screws 124 are tightened, baseplate 120 is immobilised axially. A handle 126 is advantageously provided to move weld chamber C.

We shall now explain the operation of the installation according to the present invention.

It should be noted that in the application for welding nuclear fuel rods the installation is positioned in a glove box, since the rod containing nuclear fuel is, at the start of the operation, unsealed.

In their initial position, the clamping means are untightened, pusher 32 is therefore in its back position, and flag 90 is facing second sensor 94.

A rod 6 fitted with its top plug 10 is introduced into passage 14 through entrance 16, with top plug 10 first. Rod 6 is moved along lengthways axis X until top plug 10 emerges from the clamping means in weld chamber C and comes to rest against stop 112.

Insertion and removal of rod 6 are preferably accomplished automatically. The clamping means are then activated.

To accomplish this, jack 44 is turned on, causing a movement of transmission shaft 68 of jack 44 downstream; yoke 46 then pivots around axis Y in an anticlockwise direction, causing pusher 32 to slide in shaft 15, and in gripper tightening device 26, which pushes bushing 22 against internal chamfer 30, the effect of which is to tighten lobes 24 towards lengthways axis X against cladding 8 of rod 6. The tightening is a three-point tightening, at both ends of the bushing, and in shoulder 22.3. Jack 44 is stopped when flag 90 is in front of first sensor 92.

The contraction incurred by the rod is preferably checked. To accomplish this, measurements are made of the length of the rod before and after welding. If the length difference is outside a given interval there is a problem with the clamping.

Rod 6 is then immobilised axially in device D and weld chamber C.

The relative position of mating surface 11 and of electrode 108 is preferably checked by the camera. If this relative position is not satisfactory rod 6 is moved.

When mating surface 11 is correctly positioned relative to electrode 108 electric motor 98 is activated to rotate shaft 15 around lengthways axis X, also driving the clamping means in which rod 6 is immobilised; the rod then rotates around lengthways axis X. A vacuum is simultaneously created in weld chamber C and in the rod through stop 112. It is recalled that the top plug comprises a through hole; thus, even with top plug 10 present the interior of the rod is fluidically accessible. This enables the oxygen remaining in weld chamber C and in mating surface 11, which could be unfavourable for the weld, to be extracted.

An inert gas is then made to flow in weld chamber C, and in rod 6. The rod is analysed to ensure that the oxygen concentration is below a given threshold.

When the oxygen concentration is sufficiently low, and when the speed of the rod is compliant, the welding means are activated. A weld is then formed in mating surface 11 between top plug 10 and cladding 8.

When the weld has been made along the entire periphery of rod 6 the welding means are stopped and the rotation of rod 6 is stopped.

Jack 44 is operated such that transmission shaft 68 moves in an upstream direction, causing yoke 46 to rotate in a clockwise direction. Jack 44 is stopped when flag 90 is opposite second sensor 94. Pusher 32 is then moved back, releasing the lobes of bushing 22, which move away from rod 6; the latter is then released.

The rod is then unloaded from the installation. It is then taken to a seal welding station.

The installation according to the present invention, and in particular holding device D, is of simple and robust manufacture, and simple to handle. In addition, it provides great operational safety both in relation to the rod, by preventing the rod from being marked, and in relation to the installation, since risks of accidental damage of the installation are prevented.

The installation can also easily be adapted to different sizes of rod, and more specifically to different sizes of rod top plugs.

The holding device, and therefore the installation, also have a small axial encumbrance, since the jack is positioned laterally relative to the weld chamber, and not at the end of the holding device. Lastly, because a single jack is used transverse encumbrance is limited.

The invention claimed is:

1. A device for axially holding an element of elongate shape of lengthways axis and for setting it in rotation around its' axis, said device of lengthways axis comprising:
    means configured to exert radial tightening forces on the periphery of said elongate element aligned towards the lengthways axis, by bringing said means configured to exert radial tightening forces close to said lengthways axis,
    means to cause said means configured to exert said radial tightening forces closer to one another, said means to cause comprising a pusher to apply an axial force on to said means configured to exert radial tightening forces, a counter thrust bearing to force said means configured to exert radial tightening forces to come closer to the lengthways under the effect of the axial force, a linear actuator of axis parallel to the lengthways axis of the device, a yoke which is translationally secured to said pusher and configured to rotate around a first axis orthogonal to lengthways axis and not secant with it, said first orthogonal axis being fixed, said yoke being hinged to the linear actuator around a second orthogonal axis parallel to the first orthogonal axis located opposite the first orthogonal axis relative to the lengthways axis, such that the linear actuator causes the yoke to rotate around the first orthogonal axis and a control unit to control the linear actuator according to the position of the yoke, said pusher being configured to rotate freely in said yoke,
    means to cause rotation of the means configured to exert radial tightening forces on the periphery of said elongate element and said pusher.

2. A device for axial holding and for setting in rotation according to claim 1, comprising:
    a hollow shaft of lengthways axis in which said pusher is installed such that it can slide freely, said pusher being rotationally secured to said shaft (15),
    bearings in which the hollow the shaft is mounted,
    means to cause rotation of the means configured to exert radial tightening forces on the periphery of said elongate element and said pusher, directly causing rotation of said hollow shaft.

3. A device for axial holding and setting in rotation according to claim 2, in which said means causing rotation comprise an electric motor, a first gear engaged with the electric motor, a chain surrounding said first gear and a second gear rotationally secured to said shaft and coaxial with said hollow shaft.

4. A device for axial holding and setting in rotation according to claim 1, in which the control unit to control the linear actuator comprises at least a first sensor to detect the position of the yoke in the tightened position.

5. A device for axial holding and setting in rotation according to claim 4, in which the control unit to control the linear actuator comprises a metal part rigidly connected to the yoke, and in which said first sensor is an inductive sensor, and where the detection of the presence of said metal part by said first sensor corresponding to a tightened position.

6. A device for axial holding and setting in rotation according to claim 4, comprising a second sensor to detect the untightened position.

7. A device for axial holding and setting in rotation according to claim 1, in which the linear actuator is a pneumatic jack, said device also comprising an axial force transmission shaft connecting the jack and the yoke, a hinge between said axial force transmission shaft and said yoke, said hinge comprising a universal joint hinged to the yoke around the second orthogonal axis, said universal joint being traversed by said axial force transmission shaft, and said axial force transmission shaft being connected to said universal joint.

8. A device for axial holding and setting in rotation according to claim 7, comprising elastic means installed compressed between said universal joint and a free end of said axial force transmission shaft.

9. A device for axial holding and setting in rotation according to claim 8, comprising an adjuster for adjusting the load of said elastic means.

10. A device for axial holding and setting in rotation according to claim 1, comprising mechanical stop device to limit the angular displacement of the yoke.

11. A device for axial holding and setting in rotation according to claim 10, in which the mechanical stop device comprises one first mechanical stop installed on the free end of the axial force transmission shaft and an immobile counter thrust bearing, said axial force transmission shaft traverses the immobile counter thrust bearing, and said first mechanical stop is positioned on the other side of the counter thrust bearing relative to the hinge between the yoke and the axial force transmission shaft.

12. A device for axial holding and setting in rotation according to claim 11, comprising a second mechanical stop on the axial force transmission shaft between the hinge and the counter thrust bearing.

13. A device for axial holding and setting in rotation according to claim 12, comprising an adjuster for adjusting the position along the axis of the first stop and/or the second stop.

14. A device for axial holding and setting in rotation according to claim 1, in which the yoke comprises a bore made between the first and second orthogonal axes, a hub installed such that it is hinged in said bore around an axis parallel to the first and second orthogonal axes, and a rolling bearing installed in said hub, the pusher being installed in said rolling bearing.

15. A welding installation for welding the top plugs on the nuclear fuel rods, comprising:
 a device for axial holding and setting in rotation nuclear fuel rods, said device of lengthways axis comprising:
  means configured to exert radial tightening forces on the periphery of said elongate element aligned towards the lengthways axis, by bringing said means configured to exert radial tightening forces close to said lengthways axis,
  means to cause said means configured to exert said radial tightening forces closer to one another, said means to cause comprising a pusher to apply an axial force on to said means configured to exert radial tightening forces, a counter thrust bearing to force said means configured to exert radial tightening forces to come closer to the lengthways under the effect of the axial force, a linear actuator of axis parallel to the lengthways axis of the device, a yoke which is translationally secured to said pusher and configured to rotate around a first axis orthogonal to lengthways axis and not secant with it, said first orthogonal axis being fixed, said yoke being hinged to the linear actuator around a second orthogonal axis parallel to the first orthogonal axis located opposite the first orthogonal axis relative to the lengthways axis, such that the linear actuator causes the yoke to rotate around the first orthogonal axis and a control unit to control the linear actuator according to the position of the yoke, said pusher being configured to rotate freely in said yoke,
  means to cause rotation of the means configured to exert radial tightening forces on the periphery of said elongate element and said pusher,
 a welding chamber, the rods forming elongate elements, said device comprising a through housing of lengthways axis in which the rod is intended to be held axially by tightening, and to pivot around its axis, said welding chamber being positioned at one end of the through housing opposite the end the rod being introduced, the end of the rod fitted with the plug emerging from said through housing in a welding area of said welding chamber, and said welding chamber-comprisings means of welding the top plug on the rod.

16. A welding installation according to claim 15, in which the welding chamber comprises a stop for the top plug of the rod aligned with the lengthways axis of the device.

17. A welding installation according to claim 15, in which the welding chamber comprises suction means to create a vacuum, an injector for injecting an inert gas in the welding chamber, and an analyser for analysing the atmosphere in said welding chamber, and a fluid channel connecting the suction means and the injector to the welding area.

18. A welding installation according to claim 16, in which the stop is pierced with a lengthways channel, where the fluid channel is connected to the welding area through the lengthways channel of the stop.

19. A welding installation according to claim 18, in which the fluid channel is formed by a tube rotationally secured to the stop, where said tube is installed in bearings, and where the stop is rotated by the rod.

20. A welding installation according to claim 15, comprising means to view the position of the welding means relative to a mating surface between the top plug and the cladding of the rod.

21. A welding installation according to claim 15, wherein said device is configured to check a speed of rotation of the rod and/or a quality of the atmosphere and/or a level of tightening and/or a position of the welding means relative to the mating surface.

22. A welding method implementing a welding installation for welding the top plugs on the nuclear fuel rods, comprising:
 a device for axial holding and setting in rotation nuclear fuel rods, said device of lengthways axis comprising:
  means configured to exert radial tightening forces on the periphery of said elongate element aligned towards the lengthways axis, by bringing said means configured to exert radial tightening forces close to said lengthways axis,
  means to cause said means configured to exert said radial tightening forces closer to one another, said means to cause comprising a pusher to apply an axial force on to said means configured to exert radial tightening forces, a counter thrust bearing to force said means configured to exert radial tightening forces to come closer to the lengthways under the effect of the axial force, a linear actuator of axis parallel to the lengthways axis of the device, a yoke which is translationally secured to said pusher and configured to rotate around a first axis orthogonal to lengthways axis and not secant with it, said first orthogonal axis being fixed, said yoke being hinged to the linear actuator around a second orthogonal axis parallel to the first orthogonal axis located opposite the first orthogonal axis relative to the lengthways axis, such that the linear actuator causes the yoke to rotate around the first orthogonal axis and a control unit to control the linear actuator according to the position of the yoke, said pusher being configured to rotate freely in said yoke, means to cause rotation of the means configured to exert radial tightening forces on the periphery of said elongate element and said pusher, according to claim 1, and a welding chamber, the rods forming elongate elements, said device comprising a through housing of lengthways axis in which the rod is intended to be held axially by tightening, and to pivot around its axis, said welding chamber being positioned at one end of the through housing opposite the end the rod being introduced, the end of the rod fitted with the plug emerging from said through housing in a welding area of said welding chamber, and said welding chamber comprising means of welding the top plug on the rod, said welding method comprising the following steps:
   insertion of the rod fitted with the top plug into the passage of the device, until the top plug comes to rest against the stop of the weld chamber,
   operation of the rod tightening means,
   setting the rod in rotation,
   generation of a vacuum in the welding area,
   injection of inert gas,
   welding.

23. A welding method according to claim 22, in which, prior to welding, the speed of rotation of the rod and/or the quality of the atmosphere and/or the tightening level and/or the position of the welding means relative to the mating surface are checked.

* * * * *